United States Patent [19]

Swiger

[11] Patent Number: 4,750,387
[45] Date of Patent: Jun. 14, 1988

[54] SYSTEM AND METHOD FOR GRINDING THE SAW TEETH OF A CIRCULAR SAW BLADE

[75] Inventor: Kenneth B. Swiger, St. Helens, Oreg.

[73] Assignee: Cascade/Southern Saw Corporation, Milwaukie, Oreg.

[21] Appl. No.: 948,241

[22] Filed: Dec. 31, 1986

[51] Int. Cl.[4] .............................................. B23D 63/14
[52] U.S. Cl. ........................................................ 76/37
[58] Field of Search ................. 76/37, 39, 40, 41, 112, 76/77, 75

[56] References Cited

U.S. PATENT DOCUMENTS

| | | | |
|---|---|---|---|
| 4,018,109 | 4/1977 | Stier | 76/77 |
| 4,098,149 | 7/1978 | Wright | 76/40 |
| 4,366,728 | 1/1983 | Beck et al. | 76/41 |
| 4,577,533 | 3/1986 | Lenard et al. | 76/41 |

Primary Examiner—Roscoe V. Parker
Attorney, Agent, or Firm—Marger & Johnson

[57] ABSTRACT

An automatic dual side grinder is disclosed. A circular saw blade is supported and rotated in angular increments for grinding of each saw tooth. A pair of radially-opposed, parallel grinding wheels are reciprocated, by a crank assembly radially of the blade to grind opposite sides of each tooth. The crank assembly is driven continuously by a DC electric motor. An electric control circuit for the motor has two subcircuits, each including a resistor which determines motor speed. Control is switched between the subcircuits synchronously with reciprocation by a switch actuated by a rotating cam on the crank assembly. The resistors are preferably variable rheostats. Different rheostat settings are used to grind a saw tooth at one speed and retract the grinder at a second, higher speed.

22 Claims, 3 Drawing Sheets

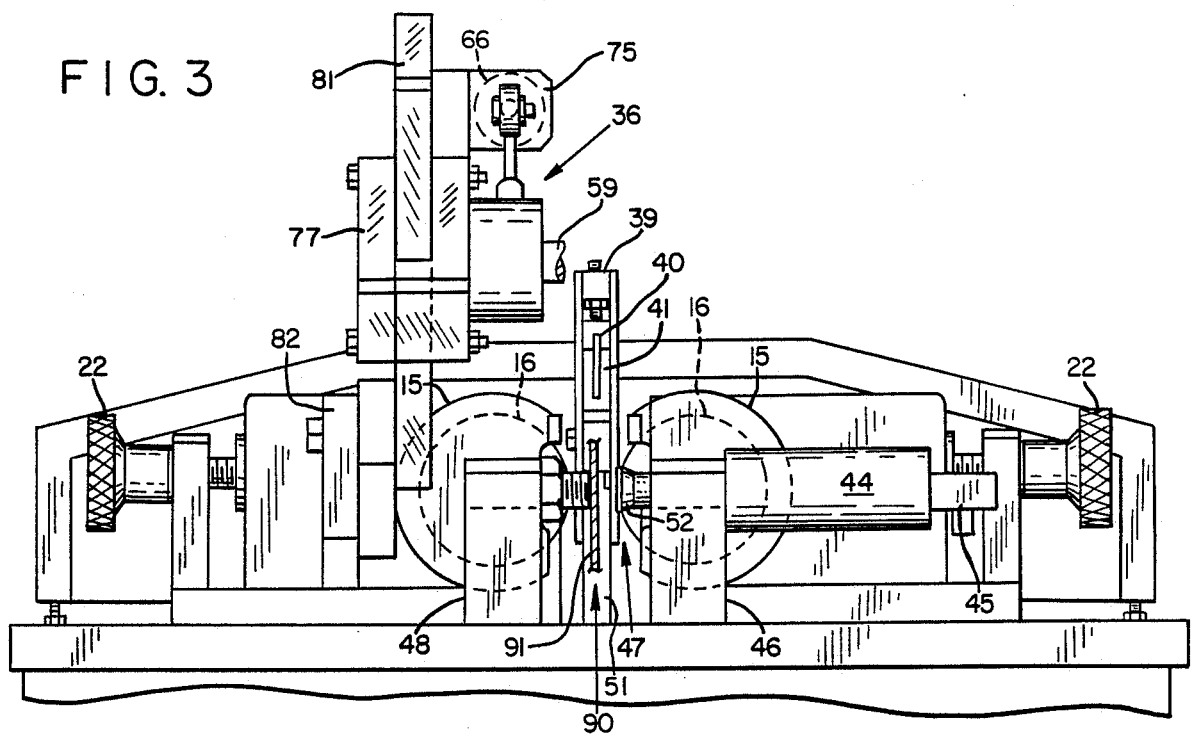
FIG. 3
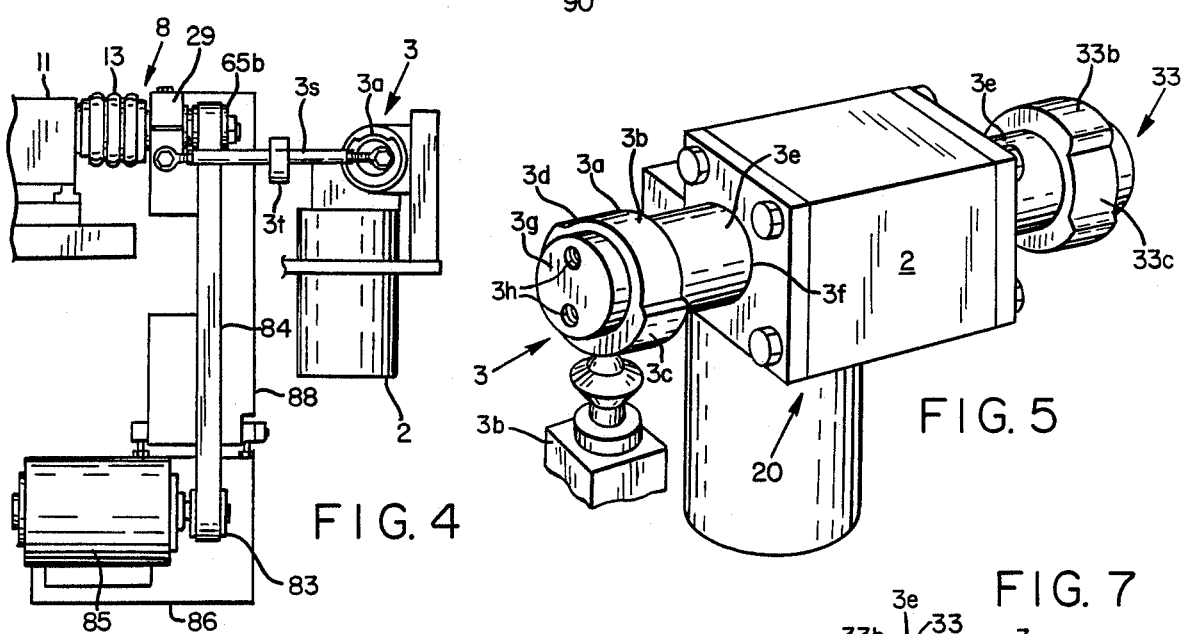
FIG. 4
FIG. 5
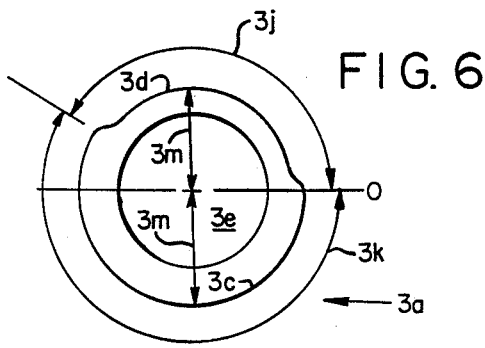
FIG. 6
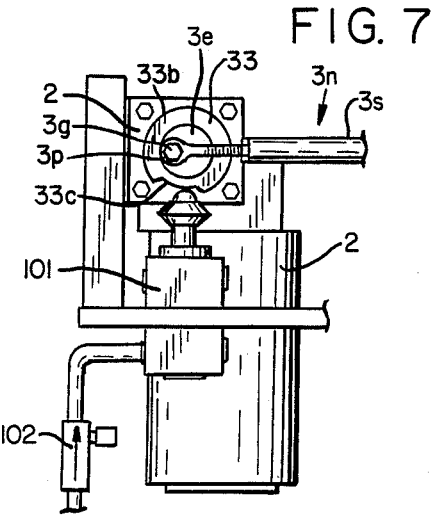
FIG. 7

SYSTEM AND METHOD FOR GRINDING THE SAW TEETH OF A CIRCULAR SAW BLADE

BACKGROUND OF THE INVENTION

This invention relates to a system and to a method for grinding a circular saw blade.

Circular saw blades are used to cut various materials. In the timber industry, for example, lumber is manufactured from logs by cutting same into discrete board sections using differing types of saws including those having circular saw blades. Maintaining the saw blade teeth is important since blades which are not properly maintained produce substantial amounts of waste by-product.

Circular saw blades are conventionally ground employing systems including various types of circular grinding wheels to grind the saw blade teeth. The critical parameter in grinding a saw blade is "precise replication". All of the saw teeth in a given saw blade must be precisely ground to a similar configuration within extremely narrow tolerances. All of the individual saw blades in a given cutting system employing a plurality of such saw blades must be replicated in order to produce a uniform product.

Conventional grinding apparatus typically employ hydraulic devices, such as hydraulic cylinders and the like, to move the grinding wheel from the retracted position into position for grinding, and then move the wheel back to a retracted position away from the blade after the grinding operation has been completed on that particular tooth. The blade is then rotated to present the next tooth for grinding and the foregoing procedure is repeated.

Hydraulic cylinders, which contain a hydraulic fluid, have a fixed stroke length and vary speed by adjusting the hydraulic fluid pressure. However, hydraulic cylinders have a number of drawbacks. First, hydraulic cylinders inherently exhibit a limited degree of precision due to a limited sensitivity of response between the mechanical cylinder elements and the pressurized hydraulic fluid. Furthermore, hydraulic systems are sensitive to external surrounding conditions in the work area such as temperature and the like. For instance, the speed of movement of the wheel in the grinding cycle and the positioning of the wheel during grinding, respectively, will be affected by the temperature of the hydraulic fluid. Thus, if the hydraulic fluid is too cold, the viscosity of the fluid will be increased, the actuation speed and responsiveness of hydraulic cylinder will be slowed. The fixed stroke length of the cylinder may not reach a fully extended position and grinding replication will not be effected. This temperature problem is particularly difficult to control in an open, expansive manufacturing environment, particularly in a facility such as a timber mill. In addition to the above operational problems, hydraulic devices are relatively expensive to purchase and maintain.

A grinding system has also been employed in which an electrical motor is the driving means for moving the grinding wheel from a retracted position to a grinding position, and then back to a retracted position. The movement of the wheel between respective retracted and grinding positions is driven by a constant speed DC motor connected to a reciprocating mechanical crank system. The speed of movement is fixed by the rate of movement that is needed during grinding of each tooth. This yields very slow operation over the entire grinding cycle.

Therefore, there is a need for a more efficient grinding system which exhibits a high degree of precise replication not achievable using conventional hydraulic devices.

SUMMARY OF THE INVENTION

The present invention is directed to a system for grinding a circular saw blade which is capable of providing a high degree of precise replication.

In addition, this grinding system overcomes a problem unrecognized by the prior art, namely, the inability of a grinding system to fully adjust the speed and sequence of operation of a saw blade during the grinding cycle. In this case, the system of the subject invention is fully adjustable with respect to the speed and sequence of movement of the grinding wheel as it is moved from a retracted position to a grinding position and then back to a retracted position. The grinding system employs electrical and mechanical positioning means which provide both the required level of replication and precision critical to effective and efficient saw tooth grinding operations. The use of hydraulic apparatus to move the grinding wheels between respective retracted and grinding positions has been eliminated.

The grinding system of the present invention comprises means for holding a circular saw blade having a plurality of saw teeth in position for rotation about its central axis and grinding wheel means for grinding the teeth of the saw blade. Preferably, the circular saw blade is subjected to a dual side grinding imparted by a system wherein the grinding wheel means comprises a pair of grinding wheels. The grinding wheels are aligned substantially parallel one to the other in a common plane of rotation to effect a substantially identical ground surface on each side of the saw tooth. The plane of rotation of the grinding wheels is disposed normal to the plane of rotation of the saw blade.

Means are provided for reciprocating the grinding wheel means through a grinding cycle in a direction normal to the circumference of the saw blade and parallel to the plane of rotation of the grinding wheel means to subject each saw tooth in turn to a grinding operation. The grinding cycle includes a first segment in which the grinding wheel means is advanced from a retracted position to a grinding position. After the grinding operation is completed, a second cycle segment is completed by moving the grinding wheel means from the grinding position back to the retracted position. A path is traversed radially of the saw blade by the grinding wheel means during the grinding cycle between the grinding position with a saw tooth of the blade against the grinding wheel means and the retracted position with the blade spaced apart from the grinding wheel means.

The reciprocating means which moves the grinding wheel means through the grinding cycle is driven by continuous driving means comprising an electrical motor. Control means for controlling the speed of operation of the drive means advances the grinding wheel means through the first segment of the grinding cycle at a first predetermined rate of speed. A sensing means is provided for detecting the completion of this first cycle segment. Then, means responsive to the detection by the sensing means of the completion of the first segment of the grinding cycle actuates a change in the control means. Now, the control means controls the speed of operation of the drive means for moving the grinding wheel through the second segment of the grinding cycle at a second predetermined rate of speed.

The grinding system includes means synchronized with the drive means for indexing the saw blade through a predetermined angular increment when the blade is spaced away from the grinding wheels.

Operation of the grinding system of the present invention is fully adjustable; the respective first and second predetermined rates of speed can be different from one another. Thus, the second predetermined rate of speed can be greater or less than the first predetermined rate of speed, and thereby speed up each grinding cycle while attaining optimum precision and replication during each grinding operation. In the former case, the grinding cycle can be speeded up while attaining optimum precision and replication during each grinding operation.

Moreover, either the first cycle segment or the second cycle segment of the grinding cycle can each be independently controlled at a plurality of variable predetermined rates of speed again depending on the particular application. Alternatively, the first and second movements can both be controlled at variable predetermined rates of speed. Control means including variable means for advancing the grinding wheel means during the first and/or second cycle can be provided for this purpose.

The foregoing and other objects, features, and advantages of this invention will become more readily apparent from the following detailed description of a preferred embodiment which proceeds with reference to the accompanying drawings.

BRIEF DESCRIPTION OF THE DRAWINGS

FIG. 3 is a front elevational view of the grinder shown in FIG. 1.

FIG. 4 is a side fragmentary view of the other side of the grinder shown in FIG. 1.

FIG. 5 is a perspective view of a preferred form of drive and electrical motor-driven crank, limit switch cam and synchronizing mechanism for the grinder of FIG. 1, including an air valve cam, respectively, in accordance with the invention.

FIG. 6 is an end view of the limit switch cam of FIG. 5.

FIG. 7 is a schematic representation of the air valve cam of FIG. 5 and associated air supply valve and one-way needle valve.

DETAILED DESCRIPTION OF PREFERRED EMBODIMENT

General Arrangement and Operation

Figure 1:
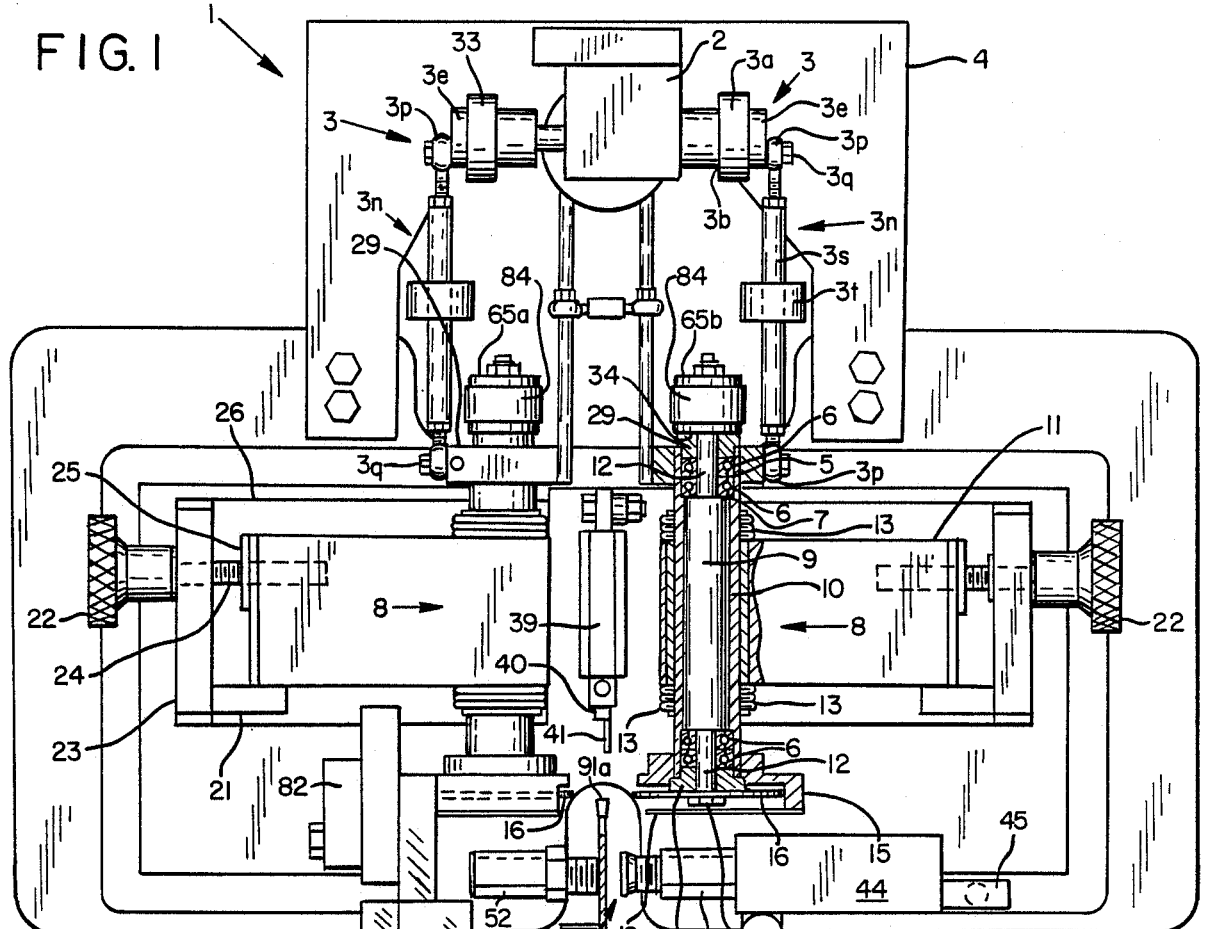
FIG. 1 is a plan view of the preferred embodiment of a dual side grinder in accordance with the present invention.

Referring now to FIG. 1, a system 1 for grinding the saw teeth 91 of a circular saw blade 90 is shown mounted on a gear motor table 4. The grinding system 1 comprises means 47 for holding the circular saw blade and for rotating same in angular increments about its central axis. Grinding wheel means including a pair of radially-opposed, circular grinding wheels 16 are provided for grinding opposite sides of the saw teeth 91. The plane of rotation of grinding wheels 16 is disposed normal to the plane of rotation the saw blade. Reciprocation means 3 reciprocates the grinding wheels 16 as a unit through a grinding cycle in a direction normal to the plane of rotation of the grinding wheels and parallel to the plane of rotation of the saw blade. Operation of the reciprocating means 3 and the means 47 for rotating the saw blade in angular increments subjects each saw tooth 91 in turn to a dual side grinding operation.

Figure 8:
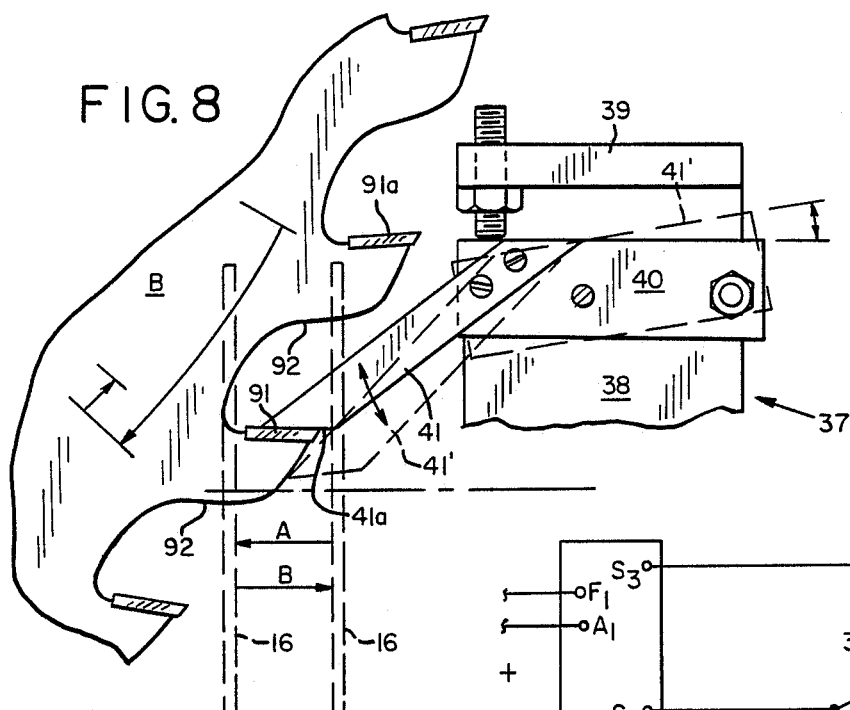
FIG. 8 is an enlarged, fragmentary view depicting the grinding of a saw tooth by dual side grinding wheels in the grinder of FIG. 1.

The grinding cycle, as illustrated in FIG. 8, comprises a first cycle segment, including a first movement of the grinding wheel 16 through distance "A" from a retracted position to a grinding position and, after the grinding operation is completed, a second cycle segment, including a second movement through distance "B" from the grinding position back to the retracted position with the wheel spaced apart from the saw teeth of the blade. Means 59 for rotationally positioning the saw blade 90 are synchronizably coupled to the reciprocation means for angularly indexing the saw blade. Rotational drive means 2 comprising a variable speed electric motor drives the reciprocating means 3.

Figure 10:
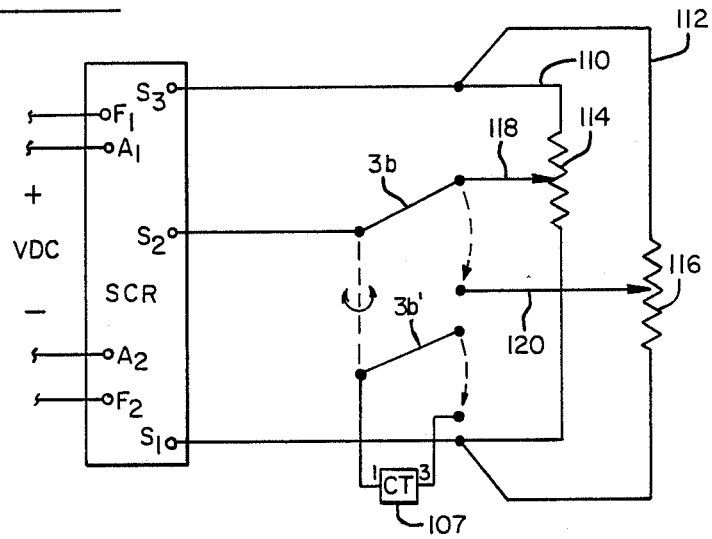
FIGS. 9 and 10 are schematic diagrams of the electrical control circuitry of the grinder in accordance with the invention.
Figure 9:
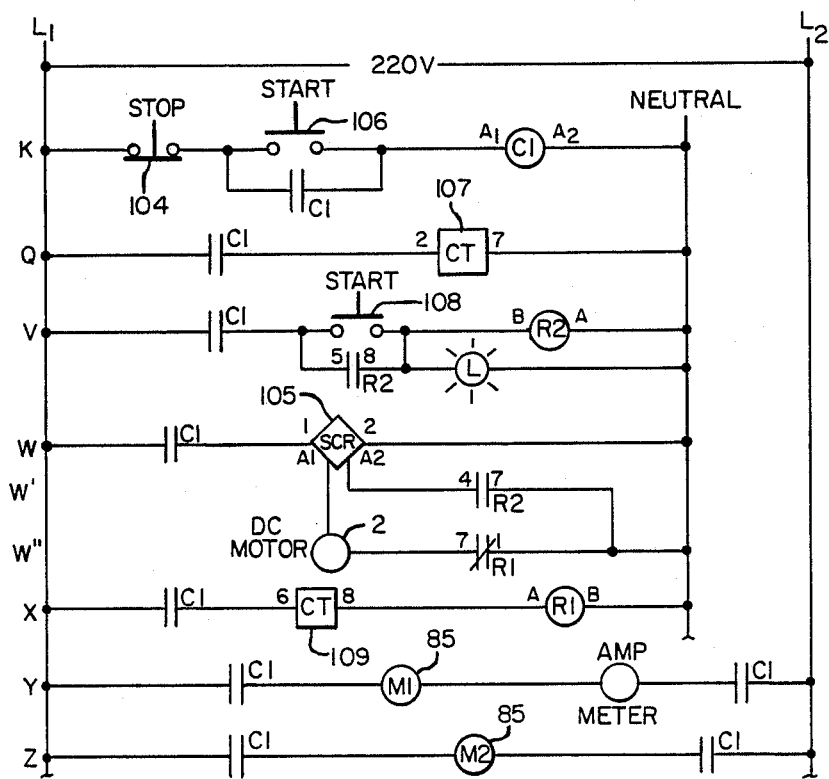

FIGS. 9 and 10 show control circuit means for powering the electrical motor. This unit includes a first control subcircuit for driving the motor at the first predetermined speed, and second control subcircuit for driving the motor at the second predetermined speed. Switching means 3a synchronously coupled to the rotational drive means 2 switches control of the electrical motor between the first and second control subcircuits. The switching means is phased to switch from the first to the second subcircuit following completion of the first cycle segment and from the second to the first subcircuit following completion of the second cycle segment.

Mechanical Arrangement

More specifically, as depicted in FIGS. 1-5 the subject system 1 includes an electrical motor 2 which drives a pair of crank means 3 for reciprocally moving a pair of grinding wheel spindle assemblies 8, each including a grinding wheel 16, through a controlled grinding cycle. Electrical motor 2, centrally mounted on table 4, is connected by a pair of coaxial drive shafts 3e on one side to crank means 3 and on the other side to crank means 3.

Crank means 3 includes a limit switch control cam 3a mounted on one of shafts 3e for synchronously controlling the speed of operation of electrical motor 2 for advancing grinding wheels 16 through a first cycle segment of the grinding cycle at a first predetermined rate of speed. A double throw, double pole limit switch 3b (FIG. 10) is actuated by control cam 3a as grinding wheel 16 is moved through a second cycle segment, following the first cycle segment, at a second predetermined rate of speed, which can be a different speed rate than the first predetermined rate of speed.

Referring to FIGS. 5 and 6, control cam 3a is mounted for rotation on shaft 3e. The cam comprises a first wheel segment 3c and a second wheel segment 3d, respectively, of different radii. The radii 3L and 3m of the respective first and second wheel segments are dimensioned for operating switch 3b as shafts 3e are rotated by motor 2. The arcuate lengths 3j and 3k of the circumference of each of the wheel segments 3c and 3d, respectively, are sized and positioned in relation to the crank throws 3q so as to determine when, during the respective first and second cycle segment, to switch operation of the motor between the first and second predetermined rates of speed. For example, in the cam 3a depicted in FIG. 6, first cam segment 3c is at an arcuate length corresponding to an angle of about 210° and second cam segment 3d is at an arcuate length corresponding to an angle of about 150°. The radii 3j and 3k are 2 inches and 2.25 inches, respectively. The first segment of the grinding cycle involves the movement of the grinding wheels 16 from a retracted to a grinding position during which movement switch 3b is controlled by the first cam segment 3j. The switch is then in the "grind" position so that motor control is determined by the first subcircuit, as shown in FIG. 10. During the second segment of the grinding cycle, in which grinding wheels 16 are moved back to a retracted position, switch 3b is positioned by the second cam segment to the "retract" position, for controlling the motor through the second subcircuit.

Shaft 3e is connected to crank arm 3n by a bolt serving as a crank throw 3q. Outer shaft end 3g includes a plurality of fastening apertures 3h capable of receiving crank through 3q. Crank arm 3n comprises bearing means 3p rotatably connecting the crank arm to the crank throw. The point of attachment of crank arm 3n to outer shaft end 3g determines the stroke length of the crank 3. Bearing means 3p is joined to the crank arm through a turnbuckle 3s. The other end of turn buckle 3s is connected to a second bearing means 3p which is rotatably connected to grinding wheel spindle assembly 8. A counterweight 3t is disposed about turnbuckle 3s.

Spindle assemblies 8 are substantially identical in construction and are mounted side by side so that the planes of rotation of each grinding wheel 16 are parallel one with respect to the other. Grinding wheels 16 are movable within spindle assembly 8 in a forward and backward axial direction for grinding both sides of a given saw blade tooth. The planes of rotation of the grinding wheels 16 are disposed normal to the plane of rotation of the saw blade.

Spindle assembly 8 comprises a spindle 9 which is cylindrical in shape and which is mounted for rotation along its longitudinal central axis about shaft 12 on bushed block 11. Rotation of spindle means 9 about its central longitudinal axis is facilitated by ball bearing means means 6 disposed within spindle bearing housing 10 adjacent to and in contact with both ends of spindle shaft 12. Rubber boots 13 are located at the respective ends of a spindle housing 10. Boots 13 are flexible so that spindle means 9 remains protectively covered throughout axial movement during the grinding cycle.

A grinder guard 15 is connected to spindle bearing housing 10 and shrouds the back and inside of grinding wheel 16. A substantial portion of the front of grinding wheel 16 is protected from direct user contact by wheel cover guard 19.

Bushed block 11 is supported atop feed table 20. Spindle assembly 8 is mounted on bush block 11 for movement of grinding wheels 16 axially, i.e., in a direction normal to the plane of rotation of the saw blade. A block adjustment knob 22 is mounted on each side of the feed table and is threaded into block 11. By turning the knob in a clockwise or counterclockwise direction, bushed block 11, and in turn grinding wheels 16, can be moved toward or away from the saw blade. A belt tension clamp 29 is connected to the rear of spindle assembly 8. Bearing means 3p of crank means 3 is attached to belt tension clamp 29 by fastening means 3q. As crank means is driven by electrical motor 2 during the grinding cycle, it reciprocates spindle means 9, which in turn reciprocates grinding wheel means 16 between respective retracted and grinding positions.

Referring to FIG. 4, grinding wheels 16 are each rotationally driven by a drive motor 85, mounted on motor mount 86 below the level of feed table 20. The motor mount is suspended by motor mount arms 88 connected to a belt tension clamp 29 mounted on the pulley ends. A lower pulley 83 is connected to drive motor 85 for rotational motion about its central axis. Upper pulleys 65 are connected at the rear of each spindle assembly 8. A drive belt 84 is disposed about lower pulley 65 and extends upwardly therefrom about upper pulleys 65a, 65b. Thus, by rotational movement of lower pulley 83 employing drive motor 85, drive belt 84 rotates upper pulleys 65a, 65b, driving spindle assemblies 8 and, in turn, grinding wheels 16.

Figure 2:
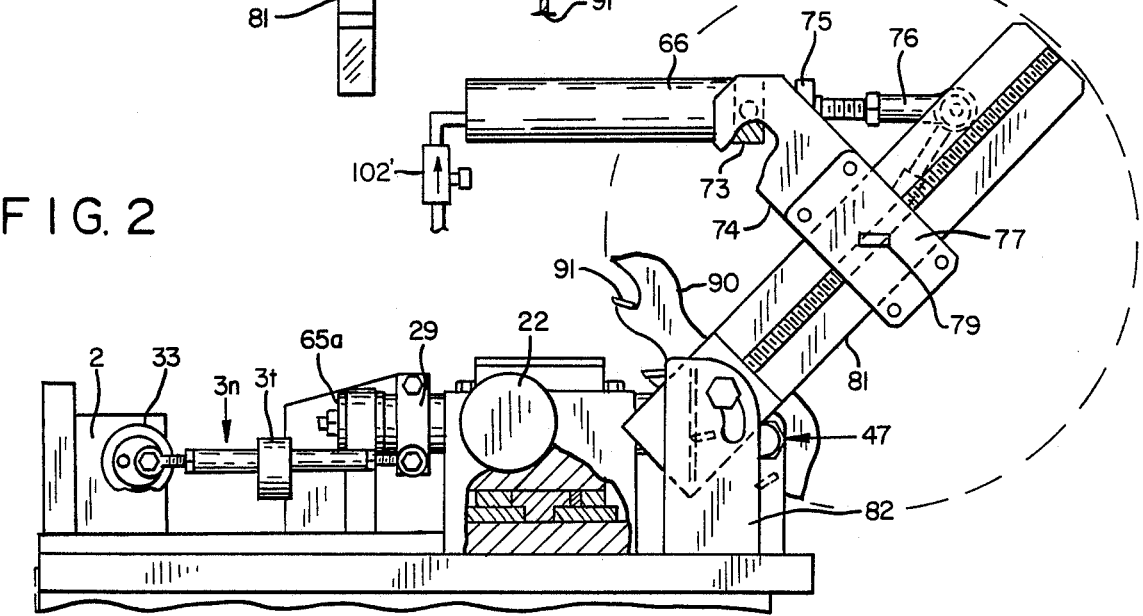
FIG. 2 is a side elevational view of the one side of the grinder shown in FIG. 1.

Referring to FIGS. 1-3, saw clamp 47 holds circular saw blade 90 for rotation about its central axis. The saw clamp includes a pair of saw clamp jaws 52 connected to respective saw clamp blocks 46 and 48. During the grinding cycle, saw blade 90 is engaged or disengaged within saw clamp 47 by the actuation or deactuation of air clamping cylinder means 44 by valve 101 with its speed controlled by control valve 45. The saw blade 90 is positioned on saw hub 59 of saw clamp arm assembly 81 with hub 59 extending through a central opening of the blade, and is held thereon by a locking cap 60 received on the end of saw hub 59. Saw hub 59 is rotatable about its central axis and is rotationally air driven by the air supply shown in FIG. 7.

The saw blade is sequentially rotated during the grinding operation so that each tooth on the periphery of the saw blade can be ground by grinding wheels 16. Referring to FIGS. 2, 3 and 8, the saw blade is rotationally indexed and positioned for grinding by air cylinder 66 and a ratchet assembly 37, respectively. Ratchet assembly 37 comprises a pair of side plates 38, spaced apart by ratchet top plate 39 and base plate 51, joined one to the other. Ratchet rocker arm 40 is pivotally connected to side plates 38 at one end and includes a ratchet finger 41 at the other end. Rachet finger extends angularly downward from rachet arm 40 forming a flat, angular end 41a which is in a substantially horizontally disposed position. As depicted in FIG. 8, in the grinding position, the top of saw tooth 91 engages end 41a. Grinding wheel 16 moves forward at first speed "A" grinding the side of tooth 91, and then moves back at second speed "B," which is different, and is typically faster than speed "A." The next tooth 91a is then rotated downward and the hook portion 92 engages the top of rachet finger, moving it downward until the saw tooth 91a passes below the end 41a. Rachet finger 91 and saw tooth 91a are then retracted to a grinding position with the top of the saw tooth engaging end 41a.

The saw blade 90 is rotationally and indexingly driven on saw hub 59 by air cylinder drive means 66 mounted on bracket 74 as shown in FIG. 2. The air cylinder is internally spring loaded to a retracted position and includes an airflow control valve (not shown) for releasing air pressure in the cylinder. Air cylinder 66 is connected by hose means to an air supply shown in FIG. 7. An air valve cam 33 is mounted on shaft 3e so as to be driven by the electric motor 2 synchronously with the reciprocation means. Air valve cam 33 operates air supply valve 101 which provides the air through air supply lines to indexing air cylinder 66 and saw clamping air cylinder 44, respectively. The air supply line to the air cylinder 66 includes one way needle valves 102 and 102′ to restrict the air flow, if necessary, during the indexing and disengagement operations so that abrupt movement of the saw blade is avoided during the indexing cycle and during subsequent operation after the saw blade is disengaged from clamping cylinder 44. Needle valve 102′ operates to restrict the air flow from air cylinder 66 and valve 102 restricts the air flow from valve 101. Cam 33 has an arcuate first segment 33b and a flat second segment 33c. No air passes from air supply valve 101 when the flat second segment 33c is actuating same. Conversely, when the arcuate first segment 33b actuates valve 101, it supplies air to respective cylinders 44 and 66. Air cylinder 66 is connected to stroke length adjuster 75 including clevis 76. Clevis 76 is in turn attached to a saw hub 59 by torque limiter assembly 36 which transmits rotational forces to the saw hub up to a maximum level and then slips to allow the indexing movement to be effected.

Referring to FIG. 2, the system can be adjusted for various angles of hook 92 by adjusting the position of bracket arm assembly 73. Bracket arm assembly 73 includes an adjusting bracket 74 which is pivotally connected to air cylinder 66. Adjusting bracket 74 includes a clamp bracket 77 which is pivotally connected to saw clamp arm 81 by thumb screw 79. The lower end of saw clamp arm 81 is pivotally attached to saw clamp post 82. Saw clamp arm 81 can be pivotally moved with respect to saw clamp 82 to a plurality of angular positions which in turn adjusts the system for various angles of hook.

Electrical Controls

Referring to FIGS. 9 and 10, the grinder is controlled through a relay circuit which is shown schematically as a 220 VAC ladder diagram. Vertical lines L1 and L2 refer to the "hot" AC lines and a vertical line "neutral" is the ground for the circuit. The grinder motor 85 is connected in line Y between the 220 volt lines L1 and L2, through two pair of relay contacts which are controlled by contactor C1. A second motor is similarly connected in line Z.

Control of these motors, and of DC motor 2, which drives the reciprocation means, is effected through 110 VAC relay circuitry as next described. Line K includes a normally closed stop switch 104 and a normally open, momentary grinding head motor start 106 switch coupled to a contactor C1. Upon momentary closure of the start switch, contactor C1 is actuated to close all of the contact switches C1 in the circuit. These contacts remain closed until the stop button is pushed, interrupting the current to the contactor. Control line W includes a silicon controlled rectifier (SCR) 105, which is connected between line L1 and neutral through a set of contacts C1. Motor 2 is preferably a shunt-wound DC motor so that it can be readily controlled by varying the voltages across both armature and field windings. AC power input to the silicon controlled rectifier is rectified and output as the DC power and the field windings on line F1,F2 to the armature circuit of motor 2 on lines A1, A2. Line A1 is connected to the armature circuit of motor 2 through the DC motor armature and normally-closed relay contacts R1 in control line W‴. Line A2 is connected to the armature circuit through normally-open relay contacts R2. Suitably, the motor is a Bodine Model NSH-34RJ and the SCR is a Bodine Model No. 913.

Line Q includes a counter(CT)107 which is powered up by closure of contacts C1 by the contactor. This counter controls counter contacts 109 in line X. It is incremental by pulses received by operation of switch 3b′. In an operative example, the counter is an Omron Tateisi Electronics Co., Model H7CN which is a normally-open counter.

Once the machine is turned on, and the grinder wheel motors are running, reciprocation of the grinding wheels is commenced by pushing a momentary, grinding sequence motor start button 108 in line V. This action activates a normally-open relay R2, which closes corresponding sets of relay contacts R2 in line V, which closes a current path across switch 108, and in line W′, which completes the DC circuit through motor 2, turning it on. Upon setting the counter, contacts 109 in subcircuit line X, which includes a normally-closed relay R1, remain open. Relay R1 remains unactuated until the counter counts to its setting. Then, it closes contacts 109, actuating relay R1 to open its contacts in line W‴ to open the DC motor armature circuit and turn off motor 2.

Referring to FIG. 10, the silicon controlled rectifier 105 has three control lines S1, S2, and S3 connected to two, alternative control subcircuits 110, 112. Each of these subcircuits is connected in parallel between SCR terminals S1 and S3. Each subcircuit also includes a 1,000 ohm rheostat 114, 116, respectively. Switch 3b, which is operated by control cam 3a, is connected to SCR terminal S2 and to the wipers of the rheostats so as to be switched alternately between wiper 118 of rheostat 114 and wiper 120 of rheostat 116.

Whichever rheostat is controlling operation of motor 2 is determined by switch 3b. The settings of the rheostats determine the DC voltage across terminals A1, A2 and thereby across the armature of DC motor 2. Rheostats are preferably used so that the DC voltage, and thereby the DC motor speed, is variable in both segments of the grinding cycle. Fixed resistors can readily be substituted for rheostat 116, thereby setting a constant speed during retraction of the grinding wheels. Fixed resistors could also be used instead of rheostat 114, but would sacrifice flexibility in varying the reciprocation speed during grinding.

In operation, the grinding system 1 of the present invention grinds a circular saw blade as follows: The blade 90 is first positioned between saw clamp jaw means 47 on saw hub 59, as previously described, in grinding position. Initially, the grinding wheels 16 are in the retracted position and cam 3a is in position at point "0" (FIG. 6) preparatory to movement into the first cycle segment 3c, and the air valve control cam 33 is at the first cycle segment 33c (FIG. 7). The air cylinders 44 and 66 are in the open position so that saw clamp jaws 47 are open and the saw blade 90 is rotated to a position such that ratchet finger 41 can engage in the gullet between teeth of saw blade 90.

The grinder is turned on by pushing start button 106. Next, the operator sets the counter to the number of teeth in the blade. Then, the operator pushes start button 108.

As the grinding cycle commences, the grinding wheels are moved forward toward the saw blade as cam 3a enters the first cycle segment 3c, rotating at, for example, about 2 rpm. If a slower or faster speed is desired in the first segment, rheostat 114 is adjusted to vary the speed of motor 2. Cam 33 moves into the second cycle segment 33b so that air is supplied to both cylinders 44 and 66. Then the tooth is moved slowly back against the ratchet to a position wherein the top of saw tooth 91a engages finger end 41a as shown in solid line in FIG. 8. The blade is then clamped in place and the grinding operation is completed as the grinding wheel moves through segment "A" as shown in FIG. 8.

Then, the grinding wheels are moved to a retracted position at a different, and in this case at a much higher rate of speed, for example, 6 rpm. This speed can be varied by adjusting rheostat 116. As the air cam 33 reaches the first segment 33c again, the air is released from both cylinders 44 and 66. Saw clamp jaws 47 are disengaged and saw blade 90 is rotated on saw hub 59 until saw tooth 91a engages rachet finger 41. The tooth moves the rachet finger to an extended position as shown in dashed lines and then releases finger 41 to a retracted position as shown in solid lines. This action is caused by a partial release of the air pressure to cylinder 66 which allows the internal spring to retract rod 76. In releasing the air from the cylinders, the airflow from the indexing cylinder is restricted by valve 102' (FIG. 2) so that the clamping cylinder is released first.

By employing the system and method of the present invention, the overall time of the operation is substantially reduced. In the example shown, grinding time is reduced by about 40% compared to a constant speed electric drive. This increase in grinding efficiency is obtained without a reduction in grinding effectiveness. Movement during reciprocation is essentially continuous, even though speed changes, and is identical for, each saw tooth, resulting in precise replication.

Having illustrated and described the principles of my invention in a preferred embodiment thereof, it should be readily apparent to those skilled in the art that the invention can be modified in arrangement and detail without departing from such principles. For example, a variable speed AC motor and appropriate controls therefor could be substituted for DC motor 2 and its controls. Similarly, a power transducer or switch can be positioned in line 4 of the control circuit to sense power drawn by the grinder motor and thereby more directly detect completion of grinding of each tooth. This approach could reduce grinding time by up to 60%. I claim all modifications coming within the spirit and scope of the accompanying claims.

I claim:

1. A grinding system for grinding the saw teeth of a circular saw blade, comprising:
   means for holding a circular saw blade having a plurality of saw teeth for rotation about its central axis;
   grinding wheel means for grinding a tooth of said saw blade;
   means for reciprocating said grinding wheel means through a grinding cycle toward and away from said saw blade to subject each saw tooth in turn to a grinding operation, said grinding cycle comprising a first cycle segment including a first movement of said grinding wheel means to a grinding position and, after said grinding operation is completed, a second cycle segment including a second movement from said grinding position back to said retracted position spaced apart from said blade;
   driving means comprising an electrical motor for driving the reciprocating means to move the grinding wheel means through said grinding cycle;
   control means for advancing the grinding wheel means through said first cycle segment at a first predetermined rate of speed, for controlling the speed of operation of said drive means;
   sensing means for detecting the completion of said first cycle segment;
   means responsive to detection of completion of said first cycle segment by said sensing means for actuating the control means for moving said holding means and saw blade through said second cycle segment at a second predetermined rate of speed.

2. The grinding system of claim 1, including means synchronized with the drive means for rotationally indexing the saw blade through a predetermined angular increment when said grinding wheel means is spaced away from said blade.

3. The grinding system of claim 1, wherein said grinding wheel means includes a pair of said grinding wheels, radially opposed about the saw blade and aligned parallel one to the other to subject a tooth of the saw blade to dual side grinding.

4. The grinding system of claim 1, wherein said first predetermined rate of speed is greater than said second predetermined rate of speed.

5. The grinding system of claim 1, wherein said first predetermined rate of speed is less than said second predetermined rate of speed.

6. The grinding system of claim 1, wherein said control means includes variable means for advancing the grinding wheel means during said first cycle at a variable predetermined rate of speed.

7. The grinding system of claim 1, wherein said control means includes variable means for advancing the grinding wheel means during said second cycle at a variable predetermined rate of speed.

8. The grinding system of claim 1, wherein said control means includes means for controlling the first and second movements at variable predetermined rates of speed.

9. The grinding system of claim 1, wherein said motor is a variable speed electric motor, the control means includes a first control subcircuit for running the motor at said first speed and a second control subcircuit for running the motor at said second speed, and the means responsive to the sensing means including a switch means for switching between the first and second subcircuits.

10. The grinding system of claim 9, wherein the motor is a DC motor and the subcircuits each include a resistor whose value determines the speed of the motor.

11. The grinding system of claim 10, wherein at least one of said resistors comprises a variable setting rheostat.

12. A method for grinding the saw teeth of a circular saw blade, comprising:
   holding a circular saw blade having a plurality of saw teeth for rotation about its central axis;
   providing grinding wheel means having a grinding surface disposed for grinding a tooth of said blade;
   reciprocating said grinding wheel means through a grinding cycle in a direction normal to the plane of said grinding wheel means and parallel to the plane of rotation of said saw blade, said grinding cycle including moving in a first cycle segment said grinding wheel means from a retracted position to a grinding position, and after grinding a first one of said teeth with said grinding wheel, moving said grinding wheel means in a second cycle segment from said grinding position back to said retracted position spaced apart from said saw blade;

driving the reciprocation of said wheel means continuously through said grinding cycle employing driving means comprising an electrical motor and speed control means;

controlling the speed of operation of said electrical motor to advance the grinding wheel means through said first cycle segment at a first predetermined rate of speed;

detecting the completion of said first cycle segment; and actuating the control means for moving said grinding means through said second cycle segment at a second predetermined rate of speed which is greater than said first predetermined rate of speed in response to detecting the end of said first moving step.

13. The method of claim 12, which includes the further step of subjecting said circular saw blade to a dual side grinding step employing a pair of radially-opposed grinding wheels.

14. The method grinding system of claim 12, which further includes the step of controlling at least one of said first and second cycle segments at a variable predetermined rate of speed.

15. The system of claim 12, wherein said electrical motor comprises a DC motor and said control means includes a resistor in each subcircuit.

16. The system of claim 15, wherein said resistors have a different resistance.

17. The system of claim 15, wherein at least one of said resistors has a variable resistance.

18. The system of claim 15, wherein the control circuit means includes a silicon controlled rectifier coupled to each resistor and to said switching means to form said first and second subcircuits.

19. The method of claim 12, further including indexing the saw blade during each grinding cycle through a predetermined angular increment when the grinding wheel is spaced apart from the saw blade.

20. The method of claim 12, further including clamping the saw blade during each grinding cycle when the grinding wheel is in the grinding position.

21. A grinding system for grinding the saw teeth of a circular saw blade, comprising:

means for holding a circular saw blade having a plurality of saw teeth for rotation about a central axis of the saw blade;

grinding wheel means having a plane of rotation which is disposed normal to the plane of rotation of said saw blade for grinding a selected tooth of the blade;

means for reciprocating said grinding wheel means through a grinding cycle in a direction normal to the plane of rotation of said grinding wheel means and parallel to the plane of rotation of said saw blade to subject each saw tooth in turn to a grinding operation, said grinding cycle comprising a first cycle segment including a first movement of said grinding wheel means from a retracted position to a grinding position and, after said grinding operation is completed, a second cycle segment including a second movement from said grinding position back to said retracted position with said wheel means spaced apart from said blade;

means for rotationally driving said saw blade synchronizably coupled to the reciprocation means for angularly indexing said saw blade when the grinding wheel means is in the retracted position;

rotational drive means including a variable speed electric motor for driving said reciprocating means to move the grinding wheel means through said grinding cycle;

control circuit means for powering said electrical motor including a first control subcircuit for driving said motor at a first predetermined speed, and a second control subcircuit for driving said motor at a second predetermined speed; and switching means synchronously coupled to said rotational drive means for switching control of said electrical motor between said first and second control subcircuits, the switching means being phased to switch from the first to the second subcircuit following completion of said first cycle segment and from said second to said first subcircuit following completion of said second cycle segment.

22. The system of claim 21, including clamping means synchronously responsive to said rotational drive means for clamping the saw blade during each grinding cycle when the grinding wheel means is in the grinding position.

* * * * *